United States Patent [19]
Takada et al.

[11] Patent Number: 5,828,527
[45] Date of Patent: Oct. 27, 1998

[54] THIN-FILM MAGNETIC HEAD HAVING MAGNETIC RESISTANCE EFFECT STABILIZING LAYER

[75] Inventors: Akio Takada; Tadayuki Honda; Takuji Shibata; Moriaki Abe, all of Tokyo, Japan

[73] Assignee: Sony Corporation, Tokyo, Japan

[21] Appl. No.: 820,343

[22] Filed: Mar. 12, 1997

[30] Foreign Application Priority Data

Mar. 14, 1996 [JP] Japan .................................. 8-057996

[51] Int. Cl.⁶ ........................................................ G11B 5/39
[52] U.S. Cl. ................................................................ 360/113
[58] Field of Search .............................................. 360/113

[56] References Cited

U.S. PATENT DOCUMENTS

| | | | |
|---|---|---|---|
| 5,329,413 | 7/1994 | Kondoh et al. | 360/113 |
| 5,432,734 | 7/1995 | Kawano et al. | 365/158 |
| 5,438,470 | 8/1995 | Ravipati et al. | 360/113 |
| 5,461,527 | 10/1995 | Akiyama et al. | 360/113 |
| 5,485,334 | 1/1996 | Nix et al. | 360/113 |
| 5,508,866 | 4/1996 | Gill et al. | 360/113 |
| 5,532,892 | 7/1996 | Nix et al. | 360/113 |
| 5,581,427 | 12/1996 | Feng et al. | 360/113 |
| 5,694,275 | 12/1997 | Watanabe et al. | 360/113 |
| 5,708,542 | 1/1998 | Takada et al. | 360/113 |

FOREIGN PATENT DOCUMENTS

| | | |
|---|---|---|
| A-1 0 539 213 | 4/1993 | European Pat. Off. . |
| 7-074022 | 3/1995 | Japan . |
| 8-153313 | 6/1996 | Japan . |
| 8-279116 | 10/1996 | Japan . |
| 8-316549 | 11/1996 | Japan . |
| 8-321015 | 12/1996 | Japan . |
| 9-180131 | 7/1997 | Japan . |
| 9-198625 | 7/1997 | Japan . |

*Primary Examiner*—Jefferson Evans
*Attorney, Agent, or Firm*—Hill & Simpson

[57] ABSTRACT

A thin-film magnetic head improves magnetic stability of a magnetoresistance effect film 13 for further stabilizing the playback output. The thin-film magnetic head has a magnetoresistance effect stabilizing layer 11, a non-magnetic layer 12 and a magnetoresistance effect layer 13 exhibiting the magnetoresistance effect. The magnetoresistance effect stabilizing layer 11 has a hard magnetic film and a soft magnetic film. The magnetoresistance effect stabilizing layer 11 has a non-magnetic film 11c of a non-magnetic material in at least a partial area between a hard magnetic film 11b and a soft magnetic film 11d. In the thin-film magnetic head, there is produced a stable magnetostatic coupling action between the magnetoresistance effect stabilizing layer 11 and the magnetoresistance effect layer 13 for increasing the magnetic stability of the magnetoresistance effect layer 13 operating as a magnetically sensitive portion.

15 Claims, 7 Drawing Sheets

THIN-FILM MAGNETIC HEAD HAVING MAGNETIC RESISTANCE EFFECT STABILIZING LAYER

BACKGROUND OF THE INVENTION

1. Field of the Invention

This invention relates to a magnetoresistance effect type thin-film magnetic head for detecting playback signals by the magnetoresistance effect, convenient for use in, for example, a hard disc device.

2. Description of the Related Art

In a magnetic recording device, such as a hard disc device, there is a demand for a higher recording density for increasing the disc recording capacity. For increasing the recording density, the recent tendency is to use a magnetoresistance effect type thin film magnetic head ("MR head") which is a magnetic head suited for reducing track width.

Figure 1:
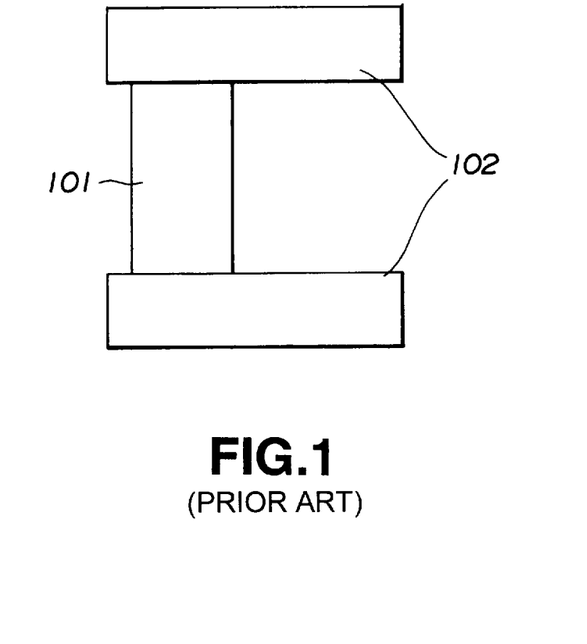
FIG. 1 is schematic view showing a basic structure of an MR head.

Basically, the MR head is made up of a magnetoresistance effect element 101 and electrodes mounted on both ends of the magnetoresistance effect element 101, as shown in FIG. 1. The magnetoresistance effect element 101 has a magnetoresistance effect film the specific resistance of which is changed depending in the intensity of the magnetic field. The sense current is supplied to this magnetoresistance effect element 101 from both electrodes 102 for detecting changes in resistance 101 by the signal magnetic field from the magnetic recording medium for obtaining the playback output based on the changes in resistance. The MR head is such that the playback output is not dependent on the speed of the recording medium thus achieving high playback output despite low speed of the recording medium.

Usually, the magnetoresistance effect film is magnetically unstable such that a magnetic wall in the film is moved under the effect of the external magnetic field. Thus the MR head suffers from a problem that the Barkhausen noise is produced due to movement of the magnetic wall of the magnetoresistance effect film in the magnetoresistance effect element. Thus it is crucial in the MR head to secure magnetic stability of the magnetoresistance effect film in the magnetoresistance effect element to reduce the Barkhausen noise.

Figure 2:
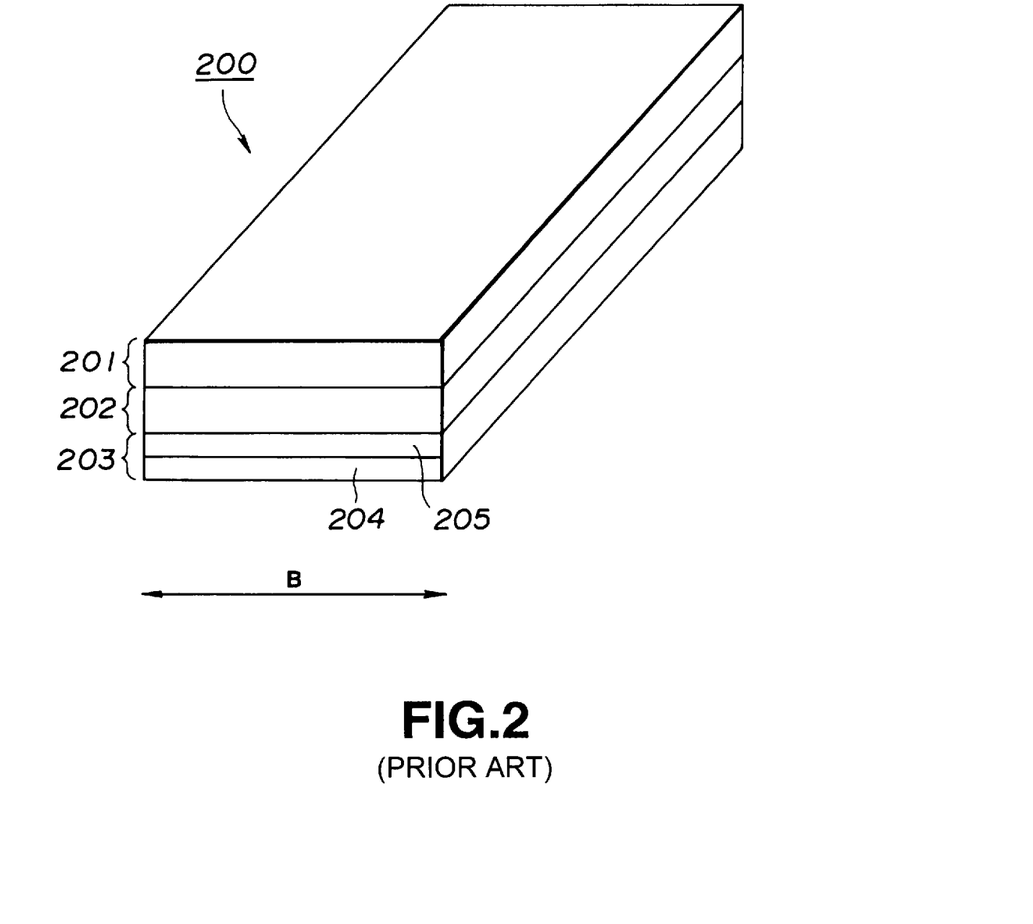
FIG. 2 is a schematic view showing an illustrative magnetoresistance effect element of a conventional MR head.

For overcoming the above inconvenience, there is proposed a magnetoresistance effect element 200 illustrated in FIG. 2 having a magnetoresistance effect stabilizing layer 203 operating for improving magnetic stability of the magnetoresistance effect film. The magnetoresistance effect element 200 is made up of a magnetoresistance effect film 201 having a magnetoresistance effect, a non-magnetic insulating film 202 and the magnetoresistance effect stabilizing layer 203, layered together. The magnetoresistance effect stabilizing layer 203 functions for magnetically stabilizing the magnetoresistance effect film 201 and is a layered structure made up of a hard magnetic film 204 having high coercivity and a soft magnetic film 205 having a low coercivity and a high magnetic permeability.

Since the magnetoresistance effect stabilizing layer 203 is comprised of the soft magnetic film 205 layered on the hard magnetic film 204, the exchange reciprocal action is produced between the hard magnetic film 204 and the soft magnetic film 205. This exchange reciprocal action is the partial magnetization of each of two neighboring layers acting in the same direction.

In the magnetoresistance effect element 200 having the above-defined magnetoresistance effect stabilizing layer 203, there is produced a magnetostatic coupling action between the magnetoresistance effect stabilizing layer 203 and the magnetoresistance effect film 201, whereby the magnetoresistance effect film 201 is magnetically stabilized. In such magnetoresistance effect stabilizing layer 203, mainly the magnetic characteristics of the soft magnetic film 205 affect the magnetic characteristics and magnetic stability of the magnetoresistance effect film 201.

Heretofore, in the magnetoresistance effect element 200 having the magnetoresistance effect stabilizing layer 203, the latter is formed by layering the hard magnetic film 204 and the soft magnetic film 205 together. In such magnetoresistance effect element 200, the magnetic characteristics and magnetic stability of the magnetoresistance effect film 201 are affected significantly by the hard magnetic film 204 and the soft magnetic film 205.

Therefore, the hard magnetic film 204 and the soft magnetic film 205 making up the magnetoresistance effect stabilizing layer 203 need to be formed under strict control of the material type, film thickness and film-forming conditions. In particular, in the magnetoresistance effect stabilizing layer 203, made up of the hard magnetic film 204 and the soft magnetic film 205, layered together, in which the magnetic characteristics of mainly the soft magnetic film 205 significantly affect the magnetic characteristics and magnetic stability of the magnetoresistance effect film 201, the soft magnetic film 205 needs to be placed under particularly strict control.

However, it is extremely difficult to control the magnetic characteristics of the hard magnetic film 204 and the soft magnetic film 205 making up the magnetoresistance effect stabilizing layer 203 with sufficient rigidity. Heretofore, the magnetic characteristics of the magnetoresistance effect stabilizing layer 203 cannot be controlled sufficiently, such that the magnetoresistance effect film 201 cannot be magnetized to a sole magnetic domain, resulting in a magnetic wall produced in the magnetoresistance effect film 201. If such magnetic wall is produced in the magnetoresistance effect film 201, the magnetic wall is moved discontinuously in the magnetoresistance effect film 201 thus producing the Barkhausen nose as described above.

SUMMARY OF THE INVENTION

It is therefore an object of the present invention to provide a magnetoresistance effect type thin-film magnetic head in which the magnetoresistance effect film may be improved in magnetic stability for further stabilizing the playback output.

According to the present invention, there is provided a thin-film magnetic head including a magnetoresistance effect layer having a soft magnetic film exhibiting the magnetoresistance effect, a non-magnetic insulating layer and a magnetoresistance effect stabilizing layer formed on the magnetoresistance effect layer via the non-magnetic insulating layer, in which the magnetoresistance effect stabilizing layer includes a hard magnetic film, a soft magnetic film and a non-magnetic film interposed between the hard magnetic film and the soft magnetic film.

According to the present invention, there is also provided a thin-film magnetic head including a magnetoresistance effect layer having a soft magnetic film exhibiting the magnetoresistance effect, a non-magnetic insulating layer and a magnetoresistance effect stabilizing layer formed on the magnetoresistance effect layer via the non-magnetic insulating layer, in which the magnetoresistance effect stabilizing layer includes a hard magnetic film, a soft magnetic film and a non-magnetic film interposed between the hard magnetic film and the soft magnetic film and in which the non-magnetic film performs control so that spin rotation of the hard magnetic film responsive to the intensity of an external magnetic field will not occur simultaneously with spin rotation of the soft magnetic film responsive to the intensity of an external magnetic field.

In the thin-film magnetic head of the present invention, the hard magnetic film and the soft magnetic film are ferromagnetically coupled to each other via non-magnetic film for forming a magnetoresistance effect stabilizing layer in a magnetically stabilized state. The magnetoresistance effect layer of a single magnetic domain is realized by the magnetically stable magnetoresistance effect stabilizing layer so that the magnetoresistance effect layer of the thin-film magnetic head thereby magnetically stabilizing the magnetoresistance effect layer for further stabilizing the playback output.

DESCRIPTION OF THE PREFERRED EMBODIMENTS

Referring to the drawings, preferred illustrative embodiments of the present invention will be explained in detail. It should be noted that the present invention is not limited to the specified embodiments as hereinafter explained and may be arbitrarily modified as to the shape or the material type without departing from the scope of the invention.

Figure 3:
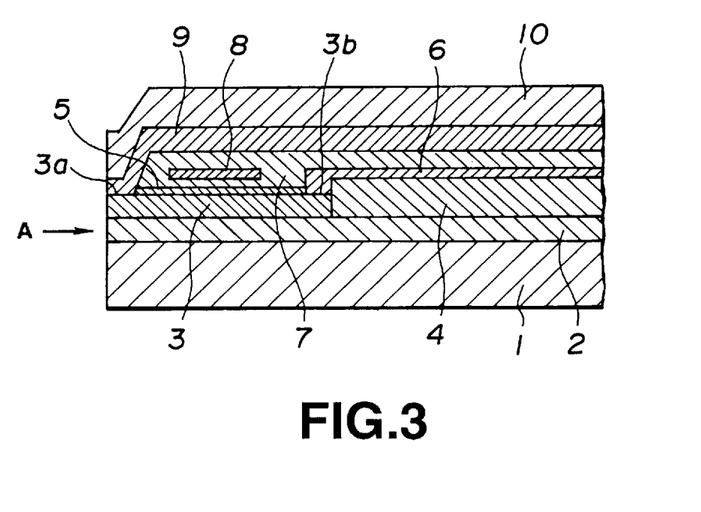
FIG. 3 is a schematic transverse cross-sectional view showing an illustrative MR head according to the present invention.

The thin-film magnetic head embodying the present invention is an MR head having a magnetoresistance effect stabilizing layer. Referring to FIG. 3, the magnetic head includes a lower layer shield 1 and a lower gap layer 2 formed on the lower layer shield 1. The magnetic head also includes a magnetoresistance effect element 3 and a non-insulating layer 4 formed on the lower gap layer 2, and a protective layer 5 formed on the area other than a foremost end 3a and a rear end 3b of the magnetoresistance effect element 3. The magnetic head also includes a conductor layer for the sense current 6 formed for extending from above the rear end 3b of the magnetoresistance effect element 3 on the non-magnetic insulating layer 4 for being connected at the rear end 3b with the magnetoresistance effect element 3 and a non-magnetic insulating layer 7 formed on the magnetoresistance effect element 3 and on the conductor layer for the sense current 6. The magnetic head also includes a conductor layer for the bias current 8 formed in the non-magnetic insulating layer 7 for overlying the magnetoresistance effect element 3 and an upper gap layer 9 formed from above the foremost end 3a of the magnetoresistance effect element 3 on the non-magnetic insulating layer 7 for being connected at the forward end 3a with the magnetoresistance effect element 3. The magnetic head further includes an upper layer shield layer 10 formed on the upper gap layer 9.

In the above MR head, the lower layer shield 1 and the upper layer shied 10 are formed of a magnetic material, while the lower gap layer 2 is formed of a non-magnetic insulating material and the upper gap layer 9 is formed of an electrically conductive non-magnetic material. The lower layer shield 1, upper layer shield 10, lower gap layer 2 and the upper gap layer 9 function for preventing the signal magnetic field from the magnetic recording medium other than that from an object to be reproduced from being introduced into the magnetoresistance effect element 3. That is, since the lower layer shield 1 and the upper layer shield 10 are arranged on the lower and upper sides of the magnetoresistance effect element 3 via lower gap layer 2 and via upper gap layer 9, respectively, the portion of the magnetic field from the magnetic recording medium other than that from the object to be reproduced is conducted to the lower layer shield 1 and the upper layer shield 10, while only the magnetic field from the object to be reproduced is introduced into the magnetoresistance effect element 3.

On the other hand, the conductor layer 6 and the upper ga layer 9 turn out to be a pair of electrodes connected to both ends of the magnetoresistance effect element 3 and function to supply the sense current to the magnetoresistance effect element 3. That is, the magnetoresistance effect element 3 is electrically connected to the conductor layer 6 for the sense current and to the upper gap layer 9 at the rear end 3b and at the foremost end 3a, respectively. For detecting the signal magnetic field from the magnetic recording medium, the sense current is supplied via these to the magnetoresistance effect element 3. The magnetoresistance effect element 3 is made up of a magnetoresistance effect stabilizing layer, a non-magnetic insulating layer and a magnetoresistance effect layer, layered together, as will be explained subsequently. The sense current is supplied only to the magnetoresistance effect layer.

The conductor layer for the bias current 8, formed in the non-magnetic insulating layer 7 for overlying the magnetoresistance effect element 3, functions to impress a bias magnetic field across the magnetoresistance effect element 3. That is, for detecting the signal magnetic field from the magnetic recording medium, the current is caused to flow in the conductor layer for the bias current 8 for applying the bias magnetic field across the magnetoresistance effect element 3 for obtaining a higher magnetoresistance effect.

Figure 4:
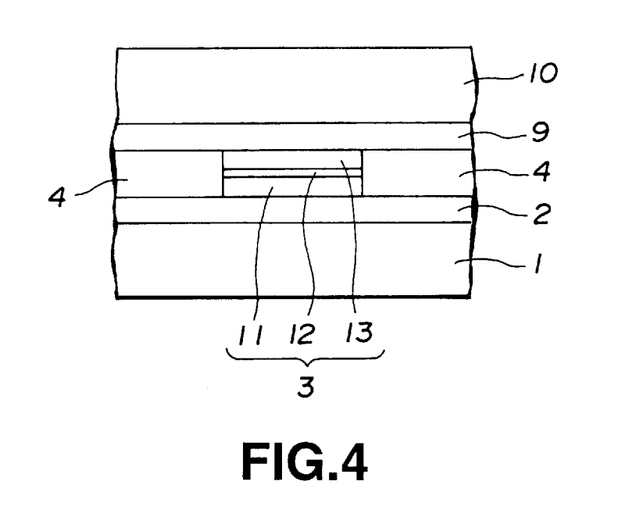
FIG. 4 is a schematic front view of the MR head of FIG. 3, looking from the surface thereof along which slides a magnetic recording medium.

FIG. 4 shows the MR head as viewed from the surface of the MR head along which is slid a magnetic recording medium, as indicated by arrow A in FIG. 3. The magnetoresistance effect element 3 is made up of a magnetoresistance effect stabilizing layer 11, a non-magnetic insulating layer 12 and a magnetoresistance effect element 13, layered together, as shown in FIG. 4. The magnetoresistance effect element 13 is fed with the sense current for operating as a magnetically sensitive portion for detecting the signal from the recording medium, as described previously. On the other hand, the magnetoresistance effect stabilizing layer 11 is magnetostatically coupled to the magnetoresistance effect element 13 for contributing to improved magnetic stability of the magnetoresistance effect element 13.

On both sides of the magnetoresistance effect element 3 are arranged non-magnetic insulating layers 4 so that the magnetoresistance effect element is, as it were, buried in the non-magnetic insulating layers 4. The non-magnetic insulating layers 4, exposed to the surface of the MR head along which slides the magnetic recording medium, is preferably formed of a material having superior sliding characteristics, such as $Al_2O_3$, $SiO_2$, $SiN_x$, e.g., $Si_4N_4$.

On both ends of the upper surface of the magnetoresistance effect element 3, the magnetoresistance effect layer 13 is connected to the electrodes. That is, as shown in FIG. 3, the upper surface of the magnetoresistance effect layer 13 is electrically connected to the upper gap layer 9 at the foremost part 3a the magnetoresistance effect element 3, while the upper surface of the magnetoresistance effect layer 13 is electrically connected to the conductor layer for the sense current 6 at the rear end 3b of the magnetoresistance effect element 3. It should be noted that the magnetoresistance effect stabilizing layer 11 has its lateral sides and its upper side insulated by the non-magnetic insulating layers 4, 12, respectively, so that there is no risk of the sense current flowing therein.

With the MR head, employing the magnetoresistance effect element 3, since the magnetostatic coupling action is produced between the magnetoresistance effect layer 13 and the magnetoresistance effect stabilizing layer 11, the magnetoresistance effect layer 13 is improved in magnetic stability, thereby reducing the Barkhausen noise.

Moreover, in the present MR head, the sense current is supplied only to the magnetoresistance effect layer 13, such that only the magnetoresistance effect layer 13 operates as the magnetically sensitive portion. Therefore, in the present MR head, it is only the thickness of the magnetoresistance effect layer 13 that contributes to the playback output. Thus, with the present MR head, the thickness contributing to the payback output can be reduced to one-half that of the MR head in which the sense current also flows in the magnetoresistance effect stabilizing layer 11. By reducing the thickness of the magnetoresistance effect layer 13 that contributes to the playback output, the current density of the sense current can be increased, thus assuring a high playback output in the present MR head.

The magnetoresistance effect element 3, employed in the above-described MR head, is now explained in detail.

The magnetoresistance effect element 3 is made up of the magnetoresistance effect stabilizing layer 11, non-magnetic insulating layer 12 and the magnetoresistance effect layer 13, operating as a magnetically sensitive portion, layered together, as explained previously.

As for the non-magnetic insulating layer 12, provided between the magnetoresistance effect stabilizing layer 11 and the magnetoresistance effect layer 13, it suffices if it is formed of an electrically insulating non-magnetic material, such as $Al_2O_3$. For reducing the gap width, a thinner thickness of the non-magnetic insulating layer 12 is desirable. However, since it is necessary to maintain insulation between the magnetoresistance effect stabilizing layer 11 and the magnetoresistance effect layer 13, a film thickness of approximately 10 nm or more is needed if use is made of $Al_2O_3$.

As for the magnetoresistance effect layer 13, it suffices if it includes a magnetoresistance effect film having the magnetoresistance effect. For example, it suffices if the layer 13 is formed only by the magnetoresistance effect film or formed by an underlying layer of Ta on which is formed a magnetoresistance effect film.

If a magnetoresistance effect film, formed of, for example, NiFe, is formed on the underlying film, such as Ta film, the magnetoresistance effect film can be oriented in (111) for lowering the specific resistance of the magnetoresistance effect film. If the magnetoresistance effect film is lowered in specific resistance, the film is lowered in impedance. Therefore, the playback output of the MR head can be improved in playback output by providing the underlying layer.

The magnetoresistance effect stabilizing layer 11 is made up of an underlying layer 11a, a hard magnetic film 11b, formed thereon, a non-magnetic film 11c formed on the hard magnetic film 11b and a soft magnetic film 11d formed on the non-magnetic film 11c. This magnetoresistance effect stabilizing layer 11 improves the magnetic stability of the magnetoresistance effect layer 13 by the magnetostatic coupling between the magnetoresistance effect stabilizing layer 11 and the magnetoresistance effect layer 13.

In the magnetoresistance effect stabilizing layer 11, the underlying layer 11a is formed of, for example, Cr, and operates for improving the coercivity Hc of the hard magnetic film 11b. The film thickness of the underlying layer 11a is preferably on the order of 10 nm. This underlying layer 11a operates for improving the coercivity of the hard magnetic film 11b and for diminishing the perpendicular component of magnetization of the hard magnetic film 11b. That is, the underlying layer 11a contributes to improved magnetic characteristics of the hard magnetic film 11b and thereby to improved magnetic stability of the magnetoresistance effect layer 13.

Figure 5:
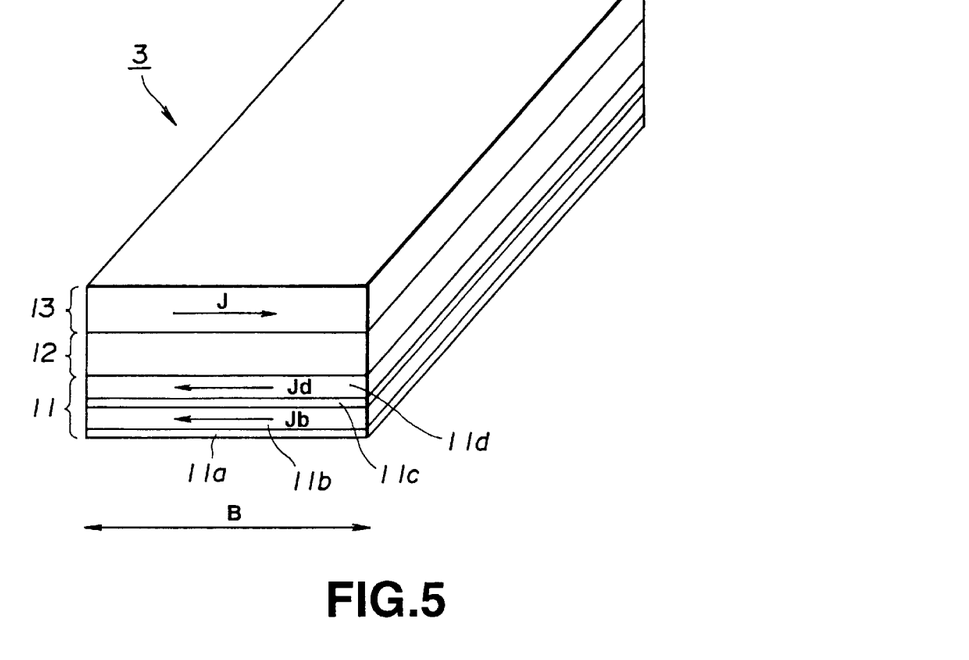
FIG. 5 is a perspective view showing an illustrative magnetoresistance effect element used in the MR head shown in FIG. 3.

The hard magnetic film 11b is formed of, for example, a hard magnetic material, such as CoPt, CoPtCr or CoNi, and is magnetized in a direction indicated by arrow Jb in FIG. 5. The hard magnetic film 11b is magnetized so that its direction of magnetization Jb will be parallel to the track width direction shown by arrow B in FIG. 3.

The non-magnetic film 11c is formed of a non-magnetic material, such as $Al_2O_3$, and is formed on the hard magnetic film 11b. The film thickness of the non-magnetic film 11c corresponding to a sole molecule suffices. However, excessive film thickness is objectionable such that the film thickness on the order of 10 nm or less is desirable. The film thickness of the non-magnetic film 11c will be explained subsequently.

The soft magnetic film 11c is formed of a soft magnetic material, such as NiFe or NiFe-X, where X is Ta, Cr or Nb. The soft magnetic film 11c is magnetized in a direction indicated by arrow Jd in FIG. 5. That is, the soft magnetic film 11d is magnetized so that the direction of magnetization Jd is parallel to the track width direction shown by arrow B in FIG. 5.

As described above, if the magnetoresistance effect stabilizing layer 11 is formed by layering the hard magnetic film 11b, non-magnetic film 11c and the soft magnetic film 11d on the underlying layer 11a, such hard magnetic layer 11b is used which is magnetized so that the direction of magnetization Jb is aligned with the track width direction B so that a magnetic field will be produced in the track width direction B by the hard magnetic film 11b and the soft magnetic film 11d. The direction of magnetization Jd of the soft magnetic film 11d is aligned with the direction of magnetization Jb of the hard magnetic film 11b by ferromagnetic coupling.

Such magnetoresistance effect stabilizing layer 11 is magnetostatically coupled with the magnetoresistance effect layer 13. Thus the direction of magnetization J of the magnetoresistance effect layer 13 is aligned with the track width direction B so that the magnetoresistance effect layer 13 is of the sole magnetic domain. The result is that the magnetoresistance effect layer 13 operates in stability without producing the noise proper to movement of the magnetic wall.

Meanwhile, it is generally difficult with the hard magnetic film to orient the direction of magnetization completely in the inplane direction, even if the film is magnetized in the inplane direction of the film, such that components of magnetization not oriented in the inplane direction are usually left. Therefore, the components perpendicular to the hard magnetic film 11b are usually contained in the components of magnetization of the hard magnetic film. If the magnetoresistance effect stabilizing layer 11 has such perpendicular components of magnetization, the magnetic stability of the magnetoresistance effect layer 13 is impaired.

However, if the magnetoresistance effect stabilizing layer 11 is formed by layering the hard magnetic film 11b and the soft magnetic film 11d via non-magnetic film 11c, the perpendicular components of the magnetization components of the hard magnetic layer 11b are interrupted by the soft magnetic layer 11d. That is, in the magnetoresistance effect stabilizing layer 11, there is produced no perpendicular component of magnetization in the soft magnetic layer 11d ferromagnetically combined with the hard magnetic film 11b. In the magnetoresistance effect stabilizing layer 11, it is mainly the soft magnetic film 11d that affects the magnetized state of the magnetoresistance effect layer 13. Therefore, in the magnetoresistance effect stabilizing layer 11, the perpendicular component of magnetization of the hard magnetic film 11b cannot significantly affect the magnetoresistance effect layer 13. Since the the perpendicular components of magnetization of the hard magnetic film 11b are interrupted in the magnetoresistance effect stabilizing layer 11 in this manner by the soft magnetic film 11c, it becomes possible with the MR head to exclude factors producing magnetic instabilities in the magnetoresistance effect layer 13 ascribable to the perpendicular components of magnetization of the hard magnetic film 11b constituting the magnetoresistance effect stabilizing layer 11.

Figure 6:
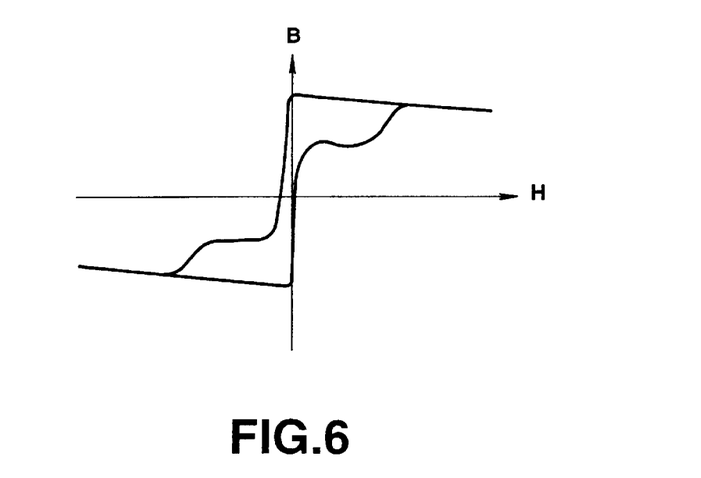
FIG. 6 is a graph showing an illustrative magnetic curve of a magnetoresistance effect stabilizing layer comprised of a hard magnetic film and a soft magnetic film coupled together by ferromagnetic coupling.

In the above-described magnetoresistance effect stabilizing layer 11, the hard magnetic layer 11d is ferromagnetically coupled with the soft magnetic film 11d via non-magnetic film 11c. In the magnetoresistance effect stabilizing layer 11, the state of ferromagnetic coupling is suitably controlled so that the magnetization curve of the magnetoresistance effect stabilizing layer 11 will be as shown in FIG. 6.

This magnetization curve differs from a magnetization curve of a magnetic material formed of a single material type and exhibits soft magnetic characteristics and hard magnetic characteristics for the small external magnetic field and for the large magnetic field, respectively.

These magnetic characteristics can be realized by the rotation by spin in the hard magnetic film 11b being not started simultaneously with the rotation by spin in the soft magnetic film 11d on impression of the magnetic field from outside. That is, the magnetoresistance effect stabilizing layer 11 is designed so that the rotation by spin is started first in the soft magnetic film 11d and, on impression of a further magnetic field subsequently, rotation by spin starts to be produced in the hard magnetic film 11b.

This state can be realized by controlling the magnetic coupling state of the hard magnetic field 11b and the soft magnetic field 11d, specifically, by appropriately setting the film thickness of the non-magnetic film 11c, as will be explained subsequently.

Figure 7:
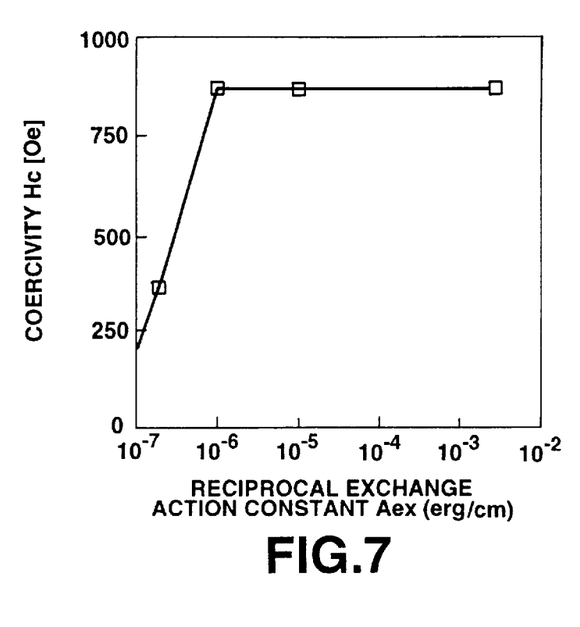
FIG. 7 is a graph showing the result of simulation of the relation between an exchange reciprocal action constant Aex between the hard and soft magnetic films and the coercivity Hc of the magnetoresistance effect stabilizing layer.

For explaining the magnetic coupling state between the hard magnetic field 11b and the soft magnetic field 11d, the results of the relation, as found by simulation, between the exchange reciprocal action constant Aex between the hard magnetic film 11b and the soft magnetic film 11d of the magnetoresistance effect stabilizing layer 11 and the coercivity Hc of the magnetoresistance effect stabilizing layer 11 are shown in FIG. 7. It is assumed for the simulation that the hard magnetic film 11b of the magnetoresistance effect stabilizing layer 11 is formed of CoPt and the soft magnetic film 11d is formed of NiFe.

As may be seen from FIG. 7, if the exchange reciprocal action constant Aex is increased, the coercivity Hc of the magnetoresistance effect stabilizing layer 11 is increased. If the exchange reciprocal action constant Aex exceeds a pre-set value, the coercivity Hc of the magnetoresistance effect stabilizing layer 11 reaches the level of the coercivity Hc of the hard magnetic film 11b to assume a constant value. That is, if the hard magnetic film 11b and the soft magnetic film 11d are layered together to constitute the magnetoresistance effect stabilizing layer 11, but the exchange reciprocal action constant Aex is increased excessively, the effect of layering the hard magnetic film 11b and the soft magnetic film 11d together is lost, such that the layered magnetoresistance effect stabilizing layer 11 is not meritorious over a magnetoresistance effect stabilizing layer formed by a sole hard magnetic film.

Therefore, if the hard magnetic film 11b and the soft magnetic film 11d are layered together to constitute the magnetoresistance effect stabilizing layer 11, it is necessary to set the film thickness of the non-magnetic film 11c between the hard magnetic film 11b and the soft magnetic film 11d appropriately for assuring a proper magnetic coupling state between the hard magnetic film 11b and the soft magnetic film 11d.

Figure 8:
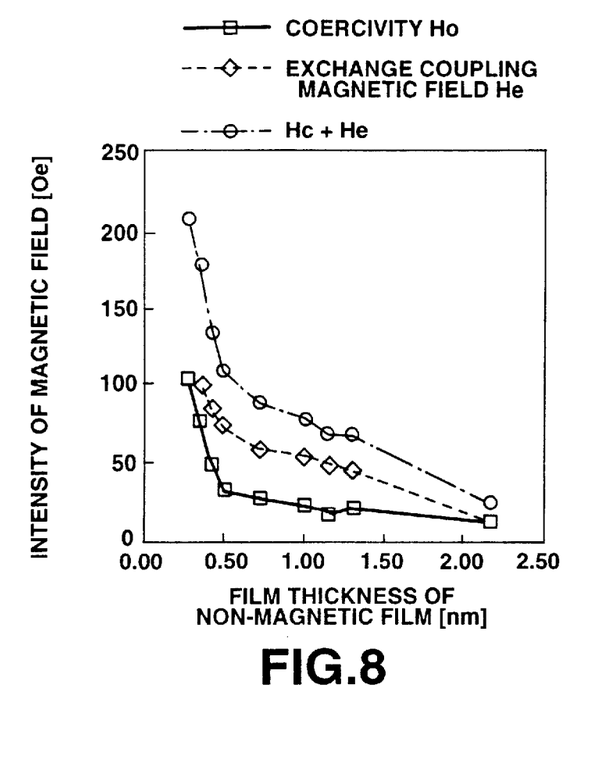
FIG. 8 is a graph showing the relation between the film thickness of a non-magnetic film arranged between the hard and soft magnetic films and magnetic characteristics of the magnetoresistance effect stabilizing layer as found by experiments.

With this in mind, the relation between the film thickness of the non-magnetic film 11c arranged between the hard magnetic film 11b and the soft magnetic film 11d and the magnetic characteristics of the magnetoresistance effect stabilizing layer 11 made up of the hard magnetic film 11b, non-magnetic film 11c and the soft magnetic film 11d was checked by experiments.

In the present experiments, the hard magnetic film 11b of the magnetoresistance effect stabilizing layer 11 was formed of CoPt, while the non-magnetic film 11c and the soft magnetic film 11d were formed of Cr and NiFe, respectively. The hard magnetic film 11b, non-magnetic film 11c and the soft magnetic film 11d were formed by sputtering. The film thickness of the non-magnetic film 11c was controlled by adjusting the film-forming rate during sputtering and the film-forming time.

FIG. 8 shows the measured results of the coercivity Hc of the magnetoresistance effect stabilizing layer 11, the exchange coupling magnetic field He between the hard magnetic film 11b and the non-magnetic film 11c making up the magnetoresistance effect stabilizing layer 11 and the sum of the coercivity Hc and the exchange coupling magnetic field He or Hc+He.

Although not shown in FIG. 8, if the film thickness of the non-magnetic film 11c is thinner than approximately 0.3 nm, the exchange coupling magnetic field He is decreased acutely. The reason is that the film thickness of the non-magnetic film 11c becomes so strong that the rotation by spin of the hard magnetic film 11b and that of the soft magnetic film 11d occur simultaneously. Since the soft magnetic characteristics of the hard magnetic film 11b is lost in this state, the magnetoresistance effect stabilizing layer 11 ceases to perform the role of stabilizing the magnetic domain of the magnetoresistance effect layer 13.

As may be seen from FIG. 8, if the film thickness of the non-magnetic film 11c is approximately 0.3 nm or larger, both the coercivity Hc and the exchange coupling magnetic field He are increased sufficiently. In this state, the exchange coupling between the hard magnetic film 11b and the soft magnetic film 11d becomes moderate such that the rotation by spin of the hard magnetic film 11b and that of the soft magnetic film 11d occur separately. In such state, the soft magnetic characteristics of the hard magnetic film 11b are displayed such that the magnetoresistance effect stabilizing layer 11 performs the role of stabilizing the magnetic domain of the magnetoresistance effect layer 13.

However, with increased film thickness of the non-magnetic film 11c, the values of the coercivity Hc and the exchange coupling magnetic field He are decreased gradually. Should the film thickness of the non-magnetic film 11c exceed approximately 3.0 nm, the exchange coupling between the hard magnetic film 11b and the soft magnetic film 11d becomes substantially nil such that it becomes impossible to stabilize the magnetic domain of the magnetoresistance effect stabilizing layer 11.

As may be seen from above, the magnetic coupling state between the hard magnetic film 11b and the soft magnetic film 11d making up the magnetoresistance effect stabilizing layer 11 can be controlled by varying the film thickness of the non-magnetic film 11c. By setting the film thickness of the non-magnetic film 11c to approximately 0.3 to 3.0 nm, the magnetic coupling state between the hard magnetic film 11b and that of the soft magnetic film 11d can be adjusted to an appropriate value. That is, the film thickness of the non-magnetic film 11c in the magnetoresistance effect stabilizing layer 11 is preferably set to a value ranging between 0.3 and 3.0 nm.

Figure 9:
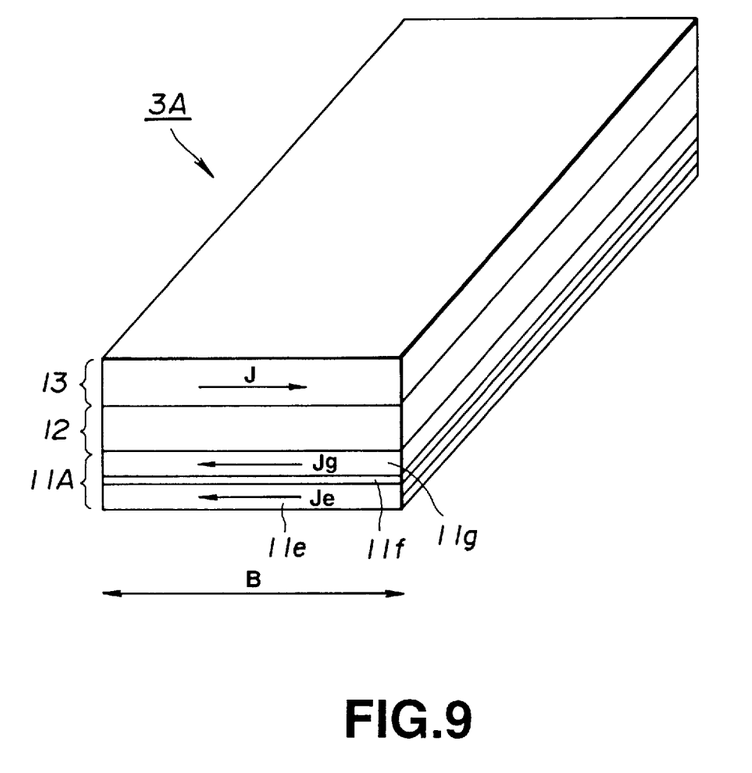
FIG. 9 is a perspective view showing another example of a magnetoresistance effect element used in the MR head shown in FIG. 3.

The thin-film magnetic head embodying the present invention is not limited to the MR head having the above-mentioned magnetoresistance effect element 3, but may also be an MR head having a magnetoresistance effect element 3A, as shown for example in FIG. 9.

This magnetoresistance effect element 3A has a magnetoresistance effect stabilizing layer 11A which is made up of a hard magnetic film 11e, a non-magnetic film 11f formed on the hard magnetic film 11e and a soft magnetic film 11g formed on the non-magnetic film 11f. This magnetoresistance effect stabilizing layer 11A operates similarly to the magnetoresistance effect stabilizing layer 11 on the magnetoresistance effect layer 13 for improving the magnetic stability of the magnetoresistance effect layer 13.

In the magnetoresistance effect stabilizing layer 11A, the hard magnetic film 11e is formed of a hard magnetic material, for example, CoPt, CoPtCr or CoNi, and is magnetized in a direction indicated by arrow Je in FIG. 9. The hard magnetic film 11e is magnetized so that its direction of magnetization Je is parallel to the track width direction indicated by arrow B in FIG. 9.

The non-magnetic member 11f is formed of a non-magnetic material, such as $Al_2O_3$, and is formed on the above-mentioned hard magnetic film 11e. Similarly to the non-magnetic film 11c of the magnetoresistance effect stabilizing layer 11, the non-magnetic member 11f has a film thickness preferably of not more than 10 nm, and more preferably in a range from 0.3 to 3.0 nm.

The soft magnetic film 11g is formed of a soft magnetic material, such as NiFe or NiFe-X, where X is Ta, Cr or Nb. The soft magnetic film 11g is magnetized in a direction indicated by arrow Jg in FIG. 9. The soft magnetic film 11g, ferromagnetically coupled to the hard magnetic film 11e, is magnetized so that the direction of magnetization thereof is parallel to the track width direction indicated by arrow B in FIG. 9.

Figure 10:
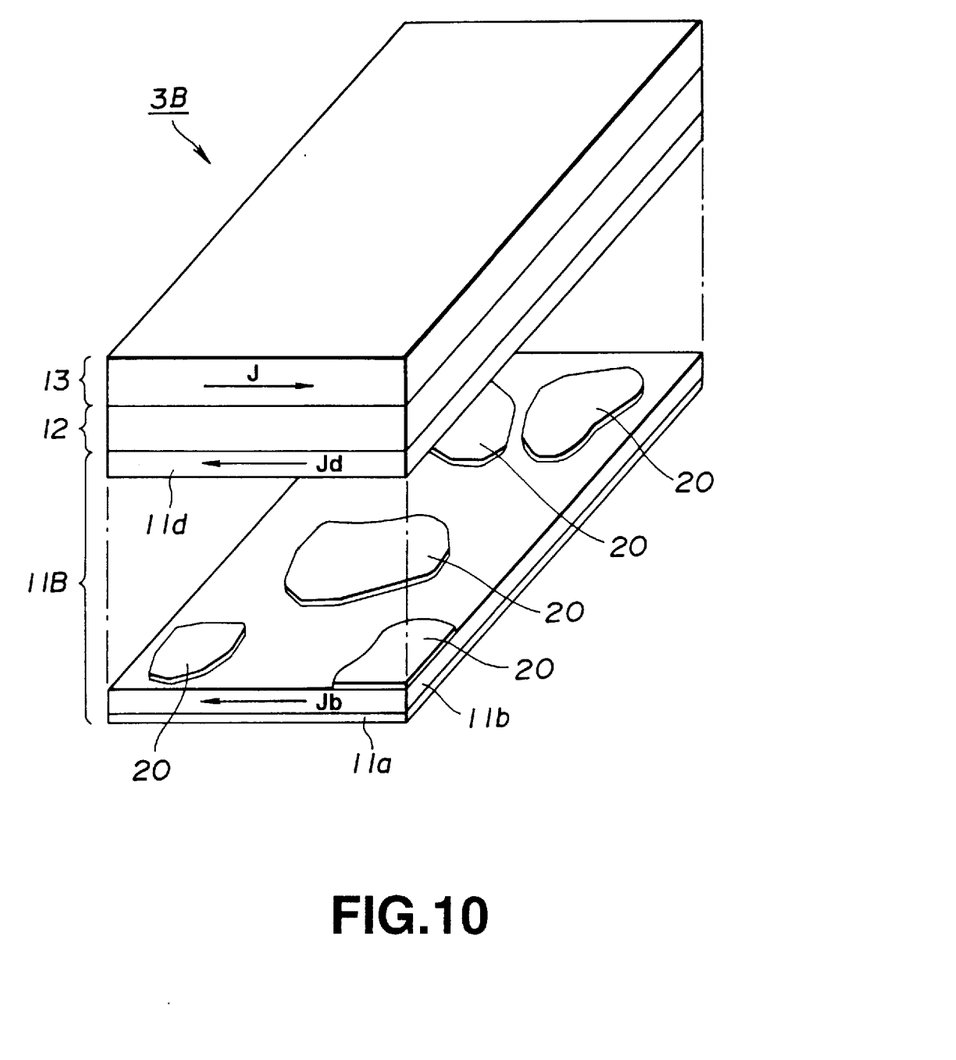
FIG. 10 is an exploded perspective view showing another illustrative magnetoresistance effect element used in an MR head according to the invention.

The thin-film magnetic head embodying the present invention is not limited to the magnetoresistance effect element 3 or 3A, but may also be an MR head having a magnetoresistance effect element 3B shown in FIG. 10.

This magnetoresistance effect element 3B is made up of a magnetoresistance effect stabilizing layer 11B, a non-magnetic insulating layer 12 formed on the magnetoresistance effect stabilizing layer 11B and a magnetoresistance effect layer 13 formed on the non-magnetic insulating layer 12.

The magnetoresistance effect stabilizing layer 11B is made up of an underlying layer 11a, a hard magnetic film 11b formed on the underlying layer 11a, a non-magnetic film 20 formed on at least a portion of the surface of the hard magnetic film 11b and a soft magnetic film 11d formed via non-magnetic film 20 on the hard magnetic film 11b. In FIG. 10, the hard magnetic film 11b is shown separated from the soft magnetic film 11d for illustrating the film-forming state of the non-magnetic film 20.

Similarly to the above-mentioned magnetoresistance effect stabilizing layers 11 and 11A, this magnetoresistance effect stabilizing layer 11B is layered via non-magnetic insulating layer 12 on the magnetoresistance effect layer 13 for magnetically stabilizing the magnetoresistance effect layer 13.

In the magnetoresistance effect stabilizing layer 11B, the non-magnetic film 20 is formed of, for example, $Al_2O_3$, and is formed by sputtering using a sputtering device. For this sputtering, the hard magnetic film 11b formed on the underlying layer 11a is used as a substrate. The non-magnetic film 20 is formed on the surface of the hard magnetic film 11b so that the film thickness anticipated from the film-forming rate and film-forming time will be not more than one molecule. The result is that the non-magnetic film 20 having a film thickness corresponding to one molecule is partially formed on the hard magnetic film 11b.

The magnetoresistance effect stabilizing layer 11B, formed as described above, is of a structure partially having the non-magnetic film 20 between the hard magnetic film 11b and the soft magnetic film 11d. In this magnetoresistance effect stabilizing layer 11B, magnetization of the soft magnetic film 11d is not affected by the perpendicular components of the hard magnetic film 11b, thus magnetically stabilizing the magnetoresistance effect layer 13.

Although the above-described magnetoresistance effect stabilizing layer 11B has the structure having the underlying layer 11a, the present invention is not limited to this specified structure. That is, the magnetoresistance effect stabilizing layer 11B may be made up only of the hard magnetic film 11b, non-magnetic film 20 and the soft magnetic film 11d without forming the underlying layer 11a.

What is claimed is:

1. A thin-film magnetic head comprising a magnetoresistance effect element comprising, in this order:

a magnetoresistance effect layer having a soft magnetic film exhibiting the magnetoresistance effect;

a non-magnetic insulating layer; and a magnetoresistance effect stabilizing layer, said stabilizing layer comprising a hard magnetic film, a soft magnetic film and a non-magnetic film interposed between said hard magnetic film and the soft magnetic film, wherein said hard magnetic film is formed of at least one hard magnetic material selected from the group consisting of CoPt, CoN, and CoPtCr, said soft magnetic film is formed of at least one soft magnetic material selected from the group consisting of NiFeTa, NiFeCr, NiFeNb and NiFe, said non-magnetic film is formed of $Al_2O_3$ or Cr and has a thickness of not less than 0.3 nm and not more than 10 nm.

2. The thin-film magnetic head as claimed in claim 1 wherein said magnetoresistance effect stabilizing layer has on said hard magnetic layer an underlying layer increasing the coercivity of said hard magnetic film.

3. The thin-film magnetic head as claimed in claim 2 wherein said underlying layer is formed of Cr.

4. The thin-film magnetic head as claimed in claim 1 wherein said non-magnetic film of said magnetoresistance effect stabilizing layer has a film thickness not more than 3 nm.

5. The thin-film magnetic head as claimed in claim 1 wherein said hard magnetic film is formed of at least one hard magnetic material selected from CoPtCr.

6. The thin-film magnetic head as claimed in claim 1 wherein said soft magnetic film is formed of at least one soft magnetic material selected from NiFe.

7. The thin-film magnetic head as claimed in claim 1 wherein said non-magnetic film is formed of Cr.

8. A thin-film magnetic head comprising:

a magnetoresistance effect layer having a soft magnetic film exhibiting the magnetoresistance effect;

a non-magnetic insulating layer; and a magnetoresistance effect stabilizing layer formed under said magnetoresistance effect layer via said non-magnetic insulating layer and having a hard magnetic film, a soft magnetic film and a non-magnetic film interposed between said hard magnetic film and the soft magnetic film, said non-magnetic film performing control so that spin rotation of said hard magnetic film responsive to the intensity of an external magnetic field will not occur simultaneously with spin rotation of said soft magnetic film responsive to the intensity of an external magnetic field, wherein said hard magnetic film is formed of at least one hard magnetic material selected from the group consisting of CoPt, CoN, and CoPtCr, said soft magnetic film is formed of at least one soft magnetic material selected from the group consisting of NiFeTa, NiFeCr, NiFeNb and NiFe, said non-magnetic film is formed of $Al_2O_3$ or Cr of a thickness of not less than 0.3 nm and not more than 10 nm.

9. The thin-film magnetic head as claimed in claim 8, wherein said magnetoresistance effect stabilizing layer has on said hard magnetic layer an underlying layer increasing the coercivity of said hard magnetic film.

10. The thin-film magnetic head as claimed in claim 9, wherein said underlying layer is formed of Cr.

11. The thin-film magnetic head as claimed in claim 8, wherein said non-magnetic film of said magnetoresistance effect stabilizing layer has a film thickness not more than 3 nm.

12. The thin-film magnetic head as claimed in claim 10, wherein said hard magnetic film is formed of at least one hard magnetic material selected from CoPtCr.

13. The thin-film magnetic head as claimed in claim 8, wherein said soft magnetic film is formed of at least one soft magnetic material selected from NiFe.

14. The thin-film magnetic head as claimed in claim 8, wherein said non-magnetic film is formed of Cr.

15. A thin-film magnetic head comprising a magnetoresistance effect element comprising:

a magnetoresistance effect layer having a soft magnetic film exhibiting the magnetoresistance effect;

a non-magnetic insulating layer; and a magnetoresistance effect stabilizing layer formed under said magnetoresistance effect layer via said non-magnetic insulating layer and comprising a hard magnetic film, a soft magnetic film, a non-magnetic film interposed between said hard magnetic film and said soft magnetic film, and an underlying layer, wherein said hard magnetic film is formed of CoPtCr, said soft magnetic film is formed of NiFe, said non-magnetic film is formed of Cr of a thickness of not less than 0.3 nm and not more than 3 nm and wherein said underlying layer is formed of Cr.

* * * * *